Patented Nov. 23, 1926.

1,607,762

UNITED STATES PATENT OFFICE.

ARTHUR PILLANS LAURIE, OF EDINBURGH, SCOTLAND.

PRESERVATION OF STONE.

No Drawing. Original application filed August 16, 1924, Serial No. 732,574, and in Great Britain August 29, 1923. Patent No. 1,585,103. dated May 18, 1926. Divided and this application filed October 31, 1925. Serial No. 66,073.

This invention relates to an improvement in or modification of the process for the preservation of stone for building purposes according to the specification of application Serial No. 705,129 filed 8th April, 1924. According to my earlier application a silicic ester diluted with a suitable volatile solvent is applied to stone, which is then exposed to the atmosphere so that the volatile solvent is evaporated and the silicic ester hydrolyzed so as to form hydrated silica which cements together the particles of the stone, holding them together and preventing the stone from further decay and at the same time partially waterproofing the stone.

In order to obtain the silicic ester industrial alcohol, or alcohol containing a small percentage of water not beyond 10%, is added slowly to silicon tetrachloride in about equal volumes and the hydrochloric acid is subsequently removed by heating the liquid to just below the boiling point of the ester or by passing hot air through the liquid or by any other similar treatment. A liquid is thus obtained which mixes readily with volatile solvents such as alcohol and benzene, and if a material such as sandstone, is moistened with this solution and then left exposed to the slow action of the moisture in the air, the liquid is slowly hydrolyzed and the particles of sandstone are cemented together by a continuous film of hydrated silica which is thus formed.

The stone is soaked with a solution obtained as above described. When exposed to the atmosphere the volatile solvent evaporates leaving behind the silicic ester which slowly decomposes forming a film of hydrated silica which cements and waterproofs the stone so that this is no longer liable to be attacked by acids or the action of the atmosphere.

If a sandstone which consists of indestructible particles of quartz which are bound together by crystals of calcite which is easily attacked by the sulphur acids in the air, is soaked in the silicic ester solution, an additional cement is added which is indestructible and at the same time waterproofs the stone and prevents the entrance of rain and injurious gases and salts, thus preserving the stone.

In the case of a lime-stone, which may be regarded as wholly soluble in acids, when this is soaked with the silicic ester, the particles thereof are cemented together and coated with a protective varnish which resists the action of acids. I have now found that if the silicic ester is slightly acid before it begins to hydrolyze, the hydrated silica which is deposited forms a hard glassy layer and this constitutes an excellent preservative or cement layer within the pores and on the surface of the stone. If the silicic ester is slightly alkaline however the hydrated silica is deposited as a soft gelatinous precipitate which is useless as a cement or preservative.

Limestones and calcareous sandstone are generally sufficiently alkaline in character to render the silicic ester alkaline and so to make the precipitate soft and useless.

I have found it to be necessary therefore to make the silicic ester slightly acid before using it as a preservative for limestones and calcareous sandstone, or as a water-proofing cement on stone of this character. According to this invention the silicic ester when prepared is first freed from hydrochloric acid, and a small proportion of a suitable acid is then added to the ester. For this purpose sulphuric acid has been found to give very satisfactory results.

When using sulphuric acid the addition of the acid may be made as follows:—The silicic ester, after being freed from hydrochloric acid as far as possible, is diluted with about an equal volume of alcohol or other suitable volatile solvent. Strong sulphuric acid is then added drop by drop to the diluted solution, with continuous or frequent shaking or stirring up of the solution. The amount of acid to be added will vary according to the material to which the silicon ester is to be applied, but it may generally be in the proportion of about 0.5 to 1.0 of the acid to 1000 parts of silicon ester.

Having thus described my invention what I claim as new and desire to secure by Letters Patent is:—

1. A solution for the preservation of stone consisting of silicic ester, free from hydrochloric acid and alcohol and having added thereto a small proportion of sulphuric acid.

2. A solution for the preservation of stone consisting of silicic ester free from hydrochloric acid diluted with about an equal volume of a volatile solvent, and having added thereto drop by drop a small proportion of strong sulphuric acid.

3. A method of preparing a solution for the preservation of stone consisting in mixing industrial alcohol and silicon tetrachloride in substantially equal proportions, heating the mixture so as to drive off hydrochloric acid gas, mixing the resultant mixture with a volatile solvent for the silicic ester and adding strong sulphuric acid drop by drop, the final solution containing about 1.0 parts of sulphuric acid to 1000 parts of silicon ester.

4. A method of preparing a solution of the character set forth consisting in heating silicic ester so as to drive off hydrochloric acid gas, mixing the resultant mixture with a volatile solvent for the silicic ester, and adding strong sulphuric acid drop by drop, the final solution containing about 1.0 parts of sulphuric acid to 1000 parts of silicic ester.

5. A method of preparing a solution of the character set forth consisting in mixing alcohol and silicon tetrachloride in substantially equal proportions, heating the mixture so as to drive off hydrochloric acid gas, mixing the resultant mixture with a volatile solvent for the silicic ester, and adding a small proportion of strong sulphuric acid drop by drop.

6. A solution of the character set forth consisting of silicic ester free from hydrochloric acid and diluted with about an equal volume of a volatile solvent, to which has been added sulphuric acid in the proportion of 1.0 parts of sulphuric acid to 1000 parts of silicic ester.

ARTHUR PILLANS LAURIE.